(No Model.) 2 Sheets—Sheet 1.

F. W. ROBINSON.
STRAW STACKER.

No. 291,088. Patented Jan. 1, 1884.

Witnesses,
John T. Deal
Jesse N. Brooks

Inventor,
F. W. Robinson
by W. T. Dennis
attorney (No Model.) 2 Sheets—Sheet 2.

F. W. ROBINSON.
STRAW STACKER.

No. 291,088. Patented Jan. 1, 1884.

Witnesses,
Fred. F. Rost
Edward Kreimeier

Inventor,
Francis W. Robinson
by W T Dennis
attorney

UNITED STATES PATENT OFFICE.

FRANCIS W. ROBINSON, OF RICHMOND, INDIANA.

STRAW-STACKER.

SPECIFICATION forming part of Letters Patent No. 291,088, dated January 1, 1884.

Application filed June 14, 1883. (No model.)

*To all whom it may concern:*

Be it known that I, FRANCIS W. ROBINSON, a citizen of the United States, residing at Richmond, in the county of Wayne and State of Indiana, have invented certain new and useful Improvements in Straw-Stackers, of which the following is a specification, reference being had therein to the accompanying drawings.

My invention relates to that class of straw-stackers which are attached to thrashing and separating machines in which the straw-stacker is arranged to swing laterally to the right or left.

Figure 1:
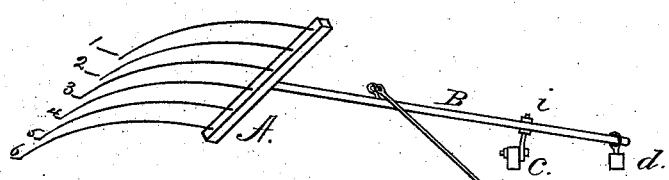
Figure 2:
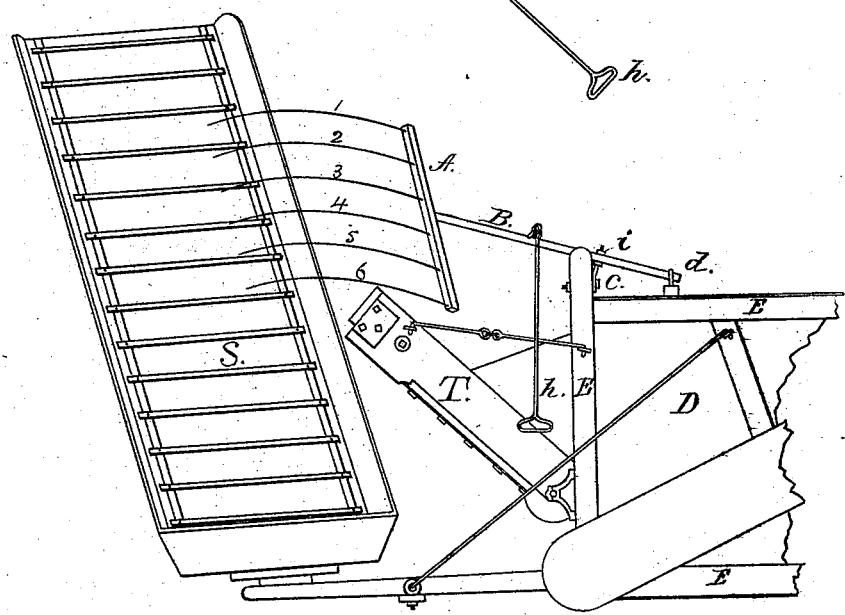
Figure 3:
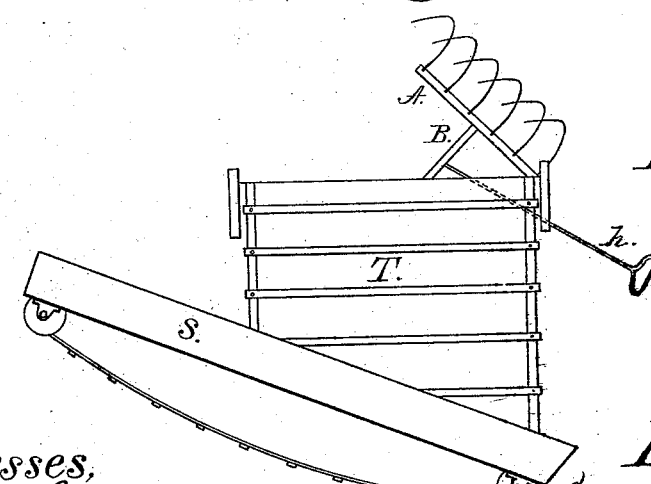
Figure 4:
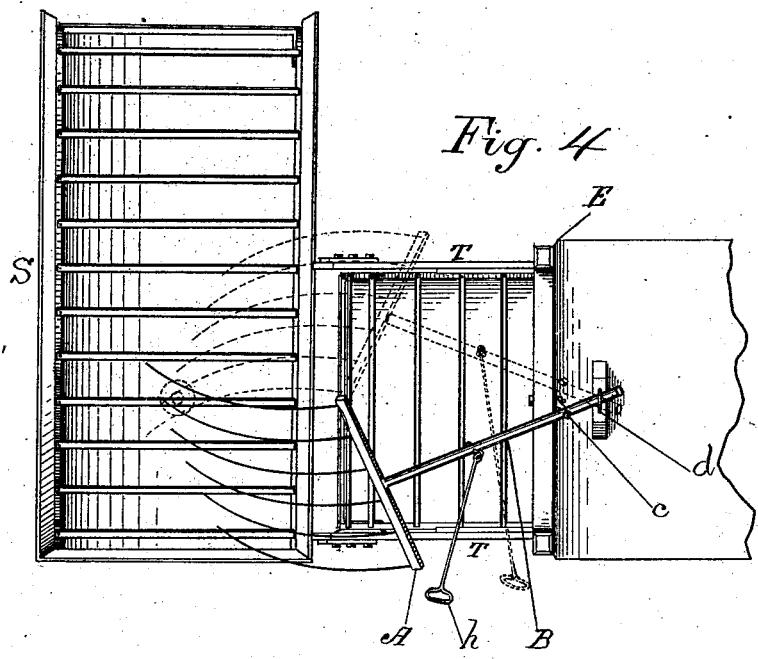

In the drawings which accompany this specification and form a part thereof, Figure 1 represents a fork-shaped guide, its handle, &c. Fig. 2 represents the rear end of an ordinary thrasher and separator, having the straw-stacker attached nearly at right angles to the thrasher and separator, and showing the guide in position. Fig. 3 is an elevation of the rear end of a thrasher and separator, and a side view of the stacker, showing the relative positions of the guide, the stacker, and the thrasher and separator. Fig. 4 is a plan view, looking down upon the stacker, the fork, and its means of support and adjustment; and the elevator is also shown in plan.

Fig. 1 represents the fork-shaped guide, in which A is the head, provided with curved tines or teeth, of such length and placed at such distance asunder as may be required. The head A is secured to the handle B in a suitable manner, and at the opposite end of the handle is a loop or ring, $d$, through which the end of the handle B passes, and in which it is permitted to turn. A bolt, $i$, passes through the handle B, which is pivoted to the center of a cross-bar extending laterally across the top of the rear end of the thrashing and separating machine, allowing the handle B to rotate in the ring $d$ when actuated by a guide-rod, $h$.

In Fig. 2, D represents a portion of the rear end of the thrashing and separating machine, to which the guide is attached, E E being portions of the framing. T is the elevator, attached to the rear end of the thrashing and separating machine, which delivers the straw to the straw-stacker S, which is shown with the outer end elevated and in a position nearly at right angles with the side of the thrashing and separating machine. The guide—composed of the head A, the tines or teeth 1 2 3 4 5 6, and the handle B, provided with a guide-rod, $h$—is attached to the cross-bar of the framing E in such manner as to permit the guide a lateral pivotal motion, while the rear end of the handle B, passing through the ring or loop D, allows it to turn partially therein. The straw, passing up the elevator T, is brought in contact with the guide, and by it is deflected toward the stacker S, upon which it falls, and is then carried onward to the point of discharge. When the stacker S is swung around into a position opposite to that shown in the drawings, the guide, by means of the guide-rod $h$, is swung to the opposite side of the thrashing and separating machine, occupying relatively the same position and performing the same functions as in the first position.

The guide may be constructed of a sheet of metal or other suitable material, and may be placed in any desired position.

When the straw-stacker is used in line with the thrashing and separating machine, and it is desired to carry the straw straight forward, the guide should be placed centrally over the rear end of the thrashing and separating machine, where it will prevent the straw from being carried too high.

The guide is turned from side to side by the guide-rod $h$ in the hands of the operator, and remains in position where it is placed.

What I claim as my invention, and desire to secure by Letters Patent, is—

The combination, with a thrashing and separating machine and straw-stacker, of the guide or fork, consisting of the head A, tines or teeth 1 2 3 4 5 6, and the handle B, the guide-rod $h$, ring $d$, bolt $i$, and framing E, substantially as and for the purposes set forth.

In testimony whereof I affix my signature in presence of two witnesses.

FRANCIS W. ROBINSON.

Witnesses:
W. T. DENNIS,
C. J. GERER.